United States Patent
Mills et al.

(10) Patent No.: US 7,792,794 B2
(45) Date of Patent: Sep. 7, 2010

(54) N-WAY SYNCHRONIZATION OF COMPUTER DATABASES

(75) Inventors: William Leonard Mills, Yacolt, WA (US); Robert G. McKenzie, Aloha, OR (US); Tom Butler, Santa Clara, CA (US); Alvin I. Pivowar, Camas, WA (US)

(73) Assignee: PalmSource Inc., Sunnyvale, CA (US)

( * ) Notice: Subject to any disclaimer, the term of this patent is extended or adjusted under 35 U.S.C. 154(b) by 223 days.

(21) Appl. No.: 11/602,841

(22) Filed: Nov. 21, 2006

(65) Prior Publication Data

US 2007/0067356 A1 Mar. 22, 2007

Related U.S. Application Data

(62) Division of application No. 10/159,688, filed on May 31, 2002, now Pat. No. 7,139,748.

(60) Provisional application No. 60/377,713, filed on May 2, 2002.

(51) Int. Cl.
G06F 17/00 (2006.01)
G06F 7/00 (2006.01)
G06F 15/16 (2006.01)

(52) U.S. Cl. .................. 707/614; 707/620; 709/248

(58) Field of Classification Search .................. None
See application file for complete search history.

(56) References Cited

U.S. PATENT DOCUMENTS

| 6,275,831 B1 | 8/2001 | Bodnar et al. ............... 707/201 |
| 6,560,655 B1 | 5/2003 | Grambihler et al. ......... 709/248 |
| 2002/0032609 A1 | 3/2002 | Wilkman .................... 705/14 |
| 2004/0255005 A1* | 12/2004 | Spooner .................... 709/218 |
| 2005/0038811 A1 | 2/2005 | Pivowar ..................... 707/102 |

* cited by examiner

*Primary Examiner*—Uyen T. Le
(74) *Attorney, Agent, or Firm*—Berry & Associates P.C.

(57) ABSTRACT

A method and system for N-way synchronization of computer databases. Synchronization of computer databases is structured into three rounds, namely an agenda round, a query round and a report round. In the agenda round, a synchronization agent software module inquires of a common synchronization engine for updates to the agent's database and provides information as to the level of information in the agent's database. During a query round, a common synchronization engine may request information from databases with new information and distribute that database information to databases needing the new information during a report round. Multiple agents, each representing an associated database may participate a synchronization. In addition, various special purpose agents may also receive, provide and otherwise operate on synchronization information.

7 Claims, 7 Drawing Sheets

N-WAY SYNCHRONIZATION OF COMPUTER DATABASES

CROSS REFERENCE TO RELATED APPLICATIONS

This application is a divisional application of application Ser. No. 10/159,688, entitles "N-WAY SYNCHRONIZATION OF COMPUTER DATABASES," filed May 31, 2002, issued as U.S. Pat. No. 7,139,748, which claims benefit of Provisional Application Ser. No. 60/377,713, entitled "N-WAY SYNCHRONIZATION OF COMPUTER DATABASES," filed May 2, 2002, assigned to the assignee of the present application. The subject matter in the above-identified and commonly owned applications are incorporated herein by reference.

BACKGROUND OF THE INVENTION

1. Field of the Invention

Embodiments of the present invention relate to database design. More particularly, embodiments of the present invention provide a method and apparatus for N-way synchronization of computer databases.

2. Background Art

A database is generally a collection of related information stored in computer readable form. Databases are ubiquitous in modern life. Mobile phones often contain databases of recently and frequently called numbers. The world wide web is comprised of countless databases. Hand held computers are in large part valuable because of the databases they contain. In fact, the databases contained in most computers are far more valuable than the computer hardware itself.

In order to use this valuable information, people must have access to the information. This is frequently accomplished using different types of computers for different situations. For example, a salesman may create a spreadsheet containing pricing information on a desktop computer, and desire to access that information via a small hand held computer while at a customer's premises.

It is often difficult, expensive or impractical to actually access the same database from both types of computers, especially if one is operated in a mobile environment. To overcome this difficulty, a process of synchronizing databases was developed.

Synchronizing a database is generally a process by which a plurality of copies of a database is maintained such that the information in all copies is the same, or synchronized. The copies need not be bit for bit identical. A synchronization process can accommodate different file structure, operating system and data media requirements. The copies are frequently on different computer systems, but it is sometimes desirable to maintain separate, synchronized databases on the same computer system. Synchronization allows updates ("mutations") e.g., additions, deletions and/or changes made to one copy of a database, for example a copy on a hand held computer, to be reflected to all copies.

Prior art synchronization systems use a "double headed" conduit program to synchronize information. As an unfortunate result, such prior art conduit programs must manage all aspects of synchronization, data retrieval and data storage between two databases, for example on a desktop computer and a hand held computer. Data retrieval and data storage may be particularly difficult in situations involving different types of computers, e.g., hand held versus desktop, which are running different operating systems, e.g., Palm OS versus Microsoft Windows, and which store information in different media, e.g., byte-addressable random access memory versus 512-byte record based rotating magnetic media. In addition, a conduit designed to synchronize a database on a hand held computer and, for example, a PC, must manage the communication between the two computers.

It is frequently necessary or desirable to synchronize more than two databases. For example, several members of a group may desire to synchronize calendar databases on their hand held computers with a group calendar on a server. Under the prior art, using double ended conduit programs, the synchronization of more than two databases typically requires multiple synchronization sessions. For example, what might be required is a first synchronization session to synchronize databases A and B, followed by a second synchronization session to synchronize databases A and C, etc. Further, in general a separate "double ended conduit program would be required for each synchronization to account for any structural differences between, for example, databases B and C.

As an unfortunate consequence of such limitations of the prior art, a general method of synchronizing multiple databases is not available. In addition, because prior art conduit programs are constructed to synchronize between two specific databases, the introduction of a new type of database typically requires the creation of not just one, but an entire set of new conduit programs to synchronize with all of the other types of databases. Such factors strongly discourage the introduction of new databases, limiting the art and utility of computer databases and hand held computers.

SUMMARY OF THE INVENTION

Accordingly, it would be advantageous to provide a method and system for N-way synchronization of computer databases. A further need exists for a method of synchronizing information among databases residing on different computers. A still further need exists for a method and system to enable special purpose agents or databases to participate in a synchronization session.

Embodiments of the present invention provide a method and system for N-way synchronization of computer databases. Further embodiments provide a method of synchronizing information among databases residing on different computers. Yet other embodiments provide a method and system to enable special purpose agents and/or databases to participate in a synchronization session.

A method and system for N-way synchronization of computer databases is disclosed. In one embodiment, synchronization of computer databases is structured into three rounds, namely an agenda round, a query round and a report round. Agents are software modules associated with databases that are used to aid in synchronization. In the agenda round, a synchronization agent software module inquires of a common synchronization engine for updates to the agent's database and provides information as to the level of information in the agent's database. During a query round, a common synchronization engine may request information from databases with new information and distribute that information to databases needing the new information during a report round. Multiple agents, each representing an associated database may participate in a synchronization. In addition, various special purpose agents may also receive, provide and otherwise operate on synchronization information. In this novel manner, multiple databases, e.g., "N," residing on a plurality of computer systems may be synchronized in a structured manner in a single synchronization session.

In another embodiment of the present invention, a booster agent augments the capabilities of a database in order to facilitate synchronization of the database.

Another embodiment of the present invention provides a method of synchronizing databases between two computers that is optimized for use of a communications channel.

DETAILED DESCRIPTION OF THE INVENTION

Figure 1:
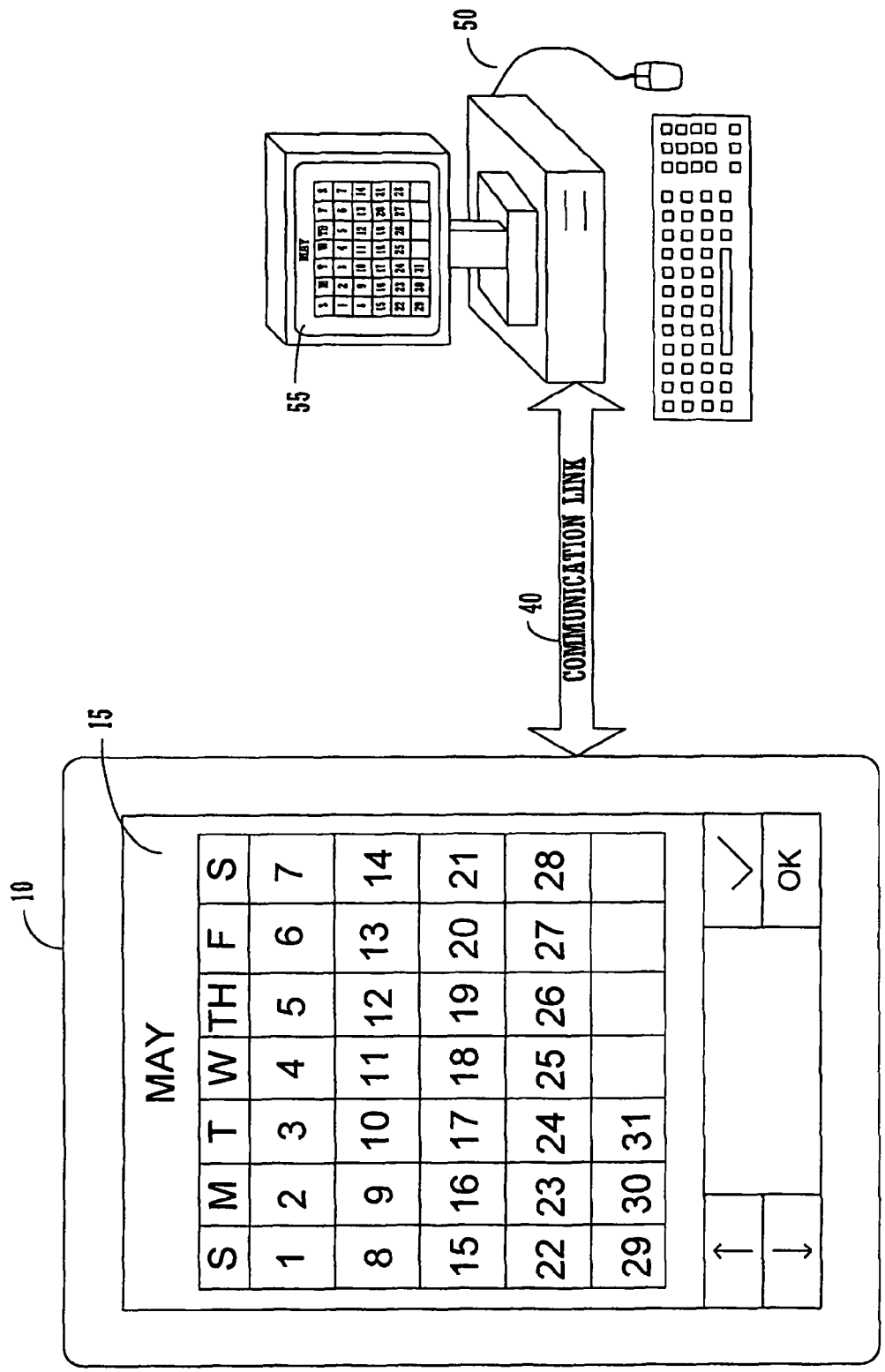
FIG. 1 illustrates a hand held computer system and a desk top computer that maintain synchronized databases, according to an embodiment of the present invention.

In the following detailed description of the present invention, N-way synchronization of computer databases, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions which follow (e.g., processes 300 and 400) are presented in terms of procedures, steps, logic blocks, processing, and other symbolic representations of operations on data bits that can be performed on computer memory. 'These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or "generating" or "demarking" or "transferring" or "synchronizing" or "accessing" or "retrieving" or "conveying" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

N-Way Synchronization of Computer Databases

U.S. Pat. No. 6,000,000, issued on Dec. 7, 1999 entitled "Extendible Method and Apparatus for Synchronizing Multiple Files on Two Different Computer Systems" and assigned to the assignee of the present invention is hereby incorporated herein by reference in its entirety.

Embodiments of the present invention are described in the context of a hand held computer system interacting with a desktop computer. However, it is appreciated that the present invention may be utilized in other types of computer systems, including embedded and distributed systems, where it may be necessary or desirable to synchronize the contents of computer readable information.

FIG. 1 illustrates a hand held computer system 10 and a desktop computer 55 that maintain synchronized databases, according to an embodiment of the present invention. It is appreciated that a wide variety of databases, resident on a variety of types of computer systems with various interconnections are well suited to embodiments of the present invention. Further, the synchronization of databases within the same computer is well suited to embodiments of the present invention.

Hand held computer system 10 is connected to desktop computer 15 through a communication link 40. Communication link 40 is often an asynchronous serial data link, for example RS-232. However, numerous wired and wireless communication links, including for example, infrared light, Bluetooth, IEEE 802.11 and universal serial bus (USB) are well suited to embodiments of the present invention. Communication link 40 allows the two computer systems to transfer information. In the example of FIG. 1, hand held computer system 10 is running a calendar (or date book) application program 15 and the desk top computer system 15 is running a complimentary calendar program 55. It is desirable for information entered into one program on one computer system, for example into calendar program 15 running on hand held computer 10, to be shared with another complimentary calendar program, for example calendar program 55 running on desk top computer system 50.

Synchronization is generally a process by which a plurality of copies of a database are maintained such that the information in all copies is the same, or synchronized. The copies need not be bit for bit identical. A synchronization process can accommodate different file structure, operating system and data media requirements. The copies are frequently on different computer systems, but it is sometimes desirable to maintain separate, synchronized databases on the same computer system. Synchronization allows modifications or updates ("mutations") of information, for example, additions, deletions and/or changes made to one copy of a database, for example a copy on a hand held computer, to be reflected to all copies.

These database copies are generally known as "endpoints." In some literature the term "farpoint" is used synonymously. An endpoint is generally a source or destination of records (individual data items) to be synchronized, e.g., a database, a communication channel, a device, etc. For example, it is commonplace to synchronize a desktop calendar system database with a calendar database on a hand held computer. In this example, the calendar database on the desktop computer is an endpoint, and the handheld calendar database is another endpoint. Endpoints are generally data structures in permanent, or semi-permanent computer memory, such as battery powered RAM in a hand held computer or magnetic media within a desktop computer. Endpoints may, however, be temporary, for example a buffer in a wireless data protocol stack.

Synchronization systems, including that described in U.S. Pat. No. 6,000,000, use a "double headed" conduit program to synchronize information between two endpoints. A double headed or two-ended conduit program manages all aspects of synchronization, data retrieval and data storage between two endpoints. In addition, two ended conduits are typically constructed to synchronize between two specific endpoints. For example, a conduit may synchronize between a contact list (phone book) database on a hand held computer and a contact list database on a desktop computer. If an application developer desires to synchronize with a third endpoint, e.g., synchronize the desktop contact list with an email application on the desktop computer (e.g., to share email addresses), under the prior art it would be necessary to construct a new and separate conduit to synchronize these two (second and third) databases (endpoints).

Figure 2:
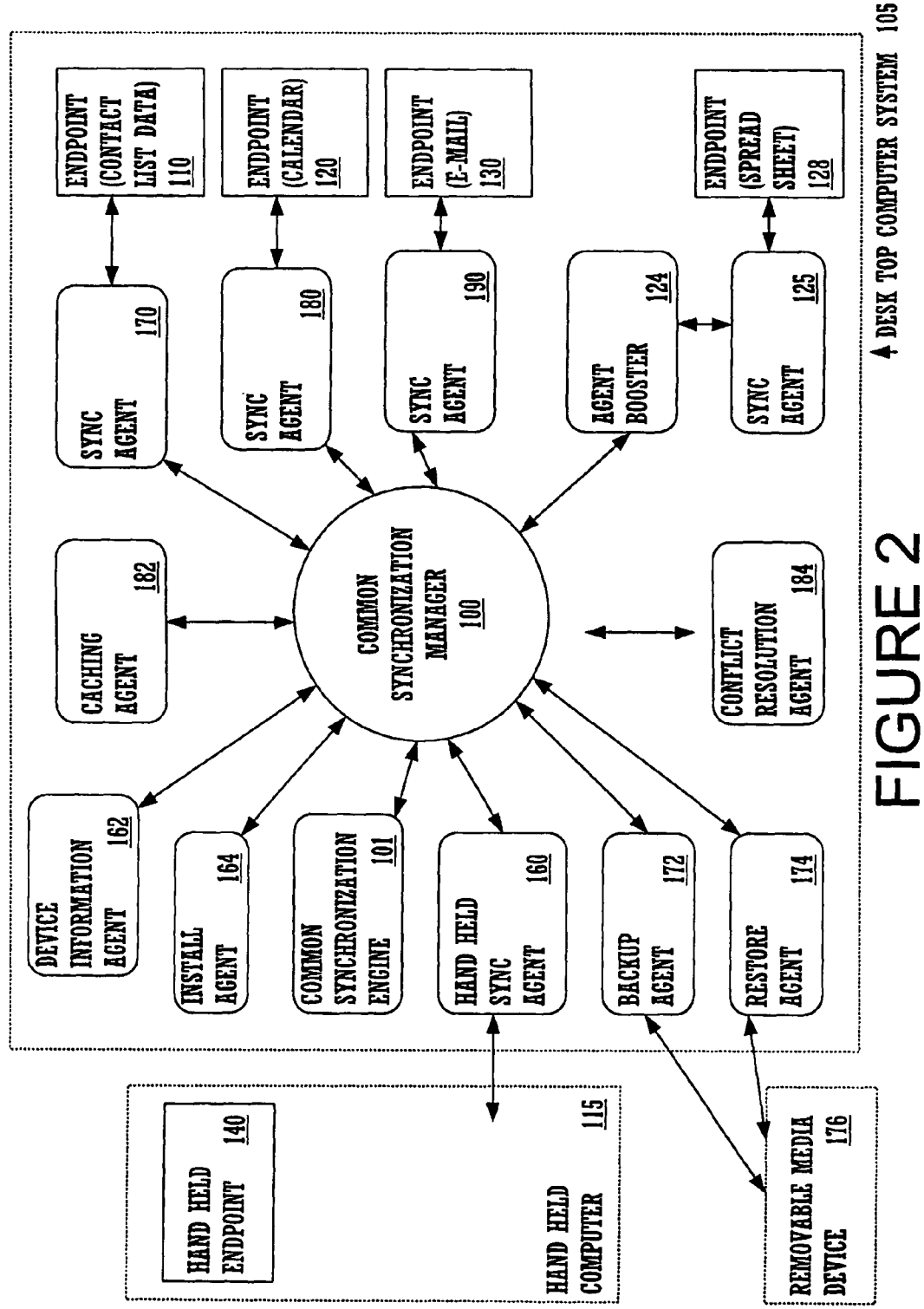
FIG. 2 illustrates a software block diagram of a novel synchronization system with single ended synchronization agents, according to an embodiment of the present invention.

FIG. 2 illustrates a software block diagram of a novel synchronization system with single ended synchronization agent programs, according to an embodiment of the present invention. It is to be appreciated that embodiments of the present invention may have greater or fewer elements of varying types than are illustrated in FIG. 2.

Desktop computer system 105 includes a plurality of synchronization ("sync") agents 170, 180 and 190, a hand held synchronization agent 160, endpoints 110, 120 and 130, and common synchronization engine 100. It is to be appreciated that the terms "agent" and "engine" as used herein refer to software modules designed to perform actions and methods described herein.

From the perspective of desktop computer system 105, hand held computer 115 comprises a single endpoint 140. It is appreciated that data stored in hand held computer 115 may be in a plurality of separate data structures.

According to an embodiment of the present invention, each synchronization agent communicates with a single endpoint. It is to be appreciated that a synchronization agent may communicate with other software modules, e.g., a common synchronization engine and/or a synchronization manager software module which generally do not represent a dataset nor are referred to as endpoints. For example, synchronization agent 170 communicates with endpoint 110, which is a contact list database. Likewise, hand held synchronization agent 160 communicates with hand held computer 115 as a single endpoint 140. It is appreciated that a wide variety of physical transport media are well suited to linking desk top computer system 105 with hand held computer 115, according to an embodiment of the present invention. Links may include, for example, asynchronous serial connections, universal serial bus (USB), ethernet, IEEE 802.11, Bluetooth, telephone lines and wide area wireless connections, e.g., CDPD, Mobitext and the like.

To perform a synchronization of data, for example, contact list data between a contact list database on desk top computer 105 and a phonebook database on hand held computer 115, common synchronization engine 100 is initiated. Common synchronization engine 100 requests information from synchronization agent 170 and hand held synchronization agent 160. A uniform communication protocol may be used between synchronization engine 100 and the agents. Synchronization agent 170 accesses endpoint 110 that contains contact list data. Hand held synchronization agent 160 accesses hand held computer 115.

Synchronization agent 170 and hand held synchronization agent 160 provide requested information to common synchronization engine 100. Generally on a record by record basis, common synchronization agent 100 will determine if the data in either endpoint, e.g., hand held endpoint 140 or endpoint 110 needs to be updated. If, for example, the contact information in hand held endpoint 140 has been updated, common synchronization engine 100 will send the updates to synchronization agent 170. Synchronization agent 170 will update the information in endpoint 110.

It is to be appreciated that synchronization may occur between any two or more synchronization agents, and that synchronization does not require hand held computer 115, according to an embodiment of the present invention. For example, an e-mail application may utilize e-mail database 130. Synchronization agent 190 may participate in the synchronization session described above in order to receive any updates to e-mail addresses entered into hand held endpoint 140 or contact list data 110. Alternatively, synchronization agent 190 may participate with synchronization agent 170 in a separate synchronization session and receive updates in this manner.

For example, assume that an e-mail address is changed on hand held computer 115. As previously described, hand held endpoint may synchronize with contact list database 110, via their associated single ended synchronization agents (160, 170) and common synchronization engine 100. At the end of that synchronization session, contact list data 110 is synchronized with the phone book database of hand held computer 115. In a subsequent synchronization session, without the participation of hand held computer 115, e-mail database 130 may be synchronized with contact list database 110. As a result of this second synchronization, e-mail database 130 receives the e-mail address previously updated on hand held computer 115.

There are numerous advantages of a single ended synchronization agent when compared to the prior art. First, a single ended synchronization agent need only "understand" the data formatting and storage requirements of a single database. In contrast, the prior art double ended synchronization conduits were required to implement the data formatting and storage requirements of both databases, which were typical radically different, residing, for example, on different types of computers. Second, the single ended synchronization agent does not perform the critical reconciliation of data that is fundamental to synchronization. A common synchronization engine (e.g., common synchronization engine 100) performs this task. Further, most single ended synchronization software modules will not have to communicate with, or process data on a hand held computer. It is anticipated that manufacturers of hand held computers will provide a synchronization agent for these purposes.

With one common synchronization engine, all synchronization and reconciliation logic, including possible multiple methodologies, are common to all synchronization processing. Centralizing this function enables a single group of highly skilled practitioners to develop and maintain this critical software. In the prior art conduits, every conduit developer had to implement all synchronization logic and methodologies, resulting in widely divergent implementations of varying quality. In the prior art these numerous implementations often led to incompatibilities and malfunctions, resulting in poor user experiences and costly service calls. Such disruptions in synchronization may reflect poorly on hand held computer manufacturers, even though their provided hardware and software was not at fault.

A single ended synchronization agent moves data between its associated endpoint and a common synchronization engine. In order to accomplish this task, the synchronization agent is able to perform at least two functions. First, the synchronization agent is able to associate an object within the synchronization engine with a corresponding object in the agent's endpoint, and associate an object within the agent's endpoint with a corresponding object in the synchronization engine. These objects will typically be records of a database, for example contact list information for an individual.

Identification of objects is a rich field in the database arts, and it is to be appreciated that many methods of identifying objects are well suited to embodiments of the present invention. Objects in the synchronization engine may be identified with a global unique identifier, GUID. Objects in the endpoint generally may be identified in an application-independent manner. It may be possible to use the endpoint's identifiers directly as GUIDs, but if the endpoint uses an incompatible system of identification, then a mapping should be maintained by the synchronization agent in order to match corresponding objects. The synchronization engine may provide a persistent GUID mapping applications programming interface, API, for synchronization agents to use.

A second function that is to be performed by a single ended synchronization agent is to deliver to a synchronization engine all data in the endpoint (e.g., database) that has changed since the last time a synchronization engine requested this same type of changed data. It is appreciated that a wide variety of methods may be used to identify objects that have changed in accordance with embodiments of the present invention. For example, one or more "dirty" bits may be set to indicate changes to an object and may be cleared after the object has been synchronized.

A "pedigree" is generally a change history of a database object, and may be used to indicate if an object has changed since a synchronization session. Copending, commonly owned U.S. patent application Ser. No. 10/159,461, filed May 31, 2002, discloses a novel pedigree system that is well suited to embodiments of the present invention, and is hereby incorporated herein by reference in its entirety.

Depending on the pedigree capabilities of the endpoint, at least four classes of synchronization agents are possible. An "ignorant" synchronization agent has no concept of pedigree in its endpoint dataset. It is also unable to determine what data has changed in its endpoint since the last synchronization. An ignorant synchronization agent can only provide the full dataset during a query. A "simple" synchronization agent has no concept of pedigree in its endpoint dataset. It uses a local cache that contains a view of the endpoint dataset at the time of the last sync. A simple synchronization agent uses this cache to determine the delta between the data in the Sync Engine and in its endpoint dataset. It provides this delta during a query. A "normal" synchronization agent uses a simple scheme to indicate a changed record in its endpoint, for example, like a dirty bit. This type of synchronization agent can provide a delta without using a cache, but cannot determine what has changed since an arbitrary sync session. A "smart" synchronization agent uses a rich pedigree scheme in its endpoint dataset and can produce a delta for any sync session.

In order to simplify the interface between a common synchronization engine and synchronization agents, it may be convenient to design the interface so that the common synchronization engine can only communicate with a "smart" synchronization agent that "understands" a particular pedigree system and a particular record identification system. In order to communicate and synchronize with databases that do not implement a chosen pedigree and/or record identification system, in accordance with one embodiment of the present invention it may be necessary to utilize an agent "booster."

An agent booster may be constructed through the use of "promoting" application programming interfaces (APIs). The following example of "boosting" the capabilities of an agent/database illustrates some relative shortcomings of some types of databases and how an agent booster may overcome such deficiencies.

Consider a very common type of database, a computer spread sheet e.g., endpoint (spreadsheet) 128 of FIG. 2, such as may be operated on by the "Excel" program, commercially available from Microsoft Corporation of Redmond, Wash. Excel databases (spreadsheets) are quite capable in terms of identifying individual data records (cells of the spreadsheet). However, typical spreadsheets have no concept of change. For the purposes of synchronization, this lack of a change history is a severe shortcoming, and aligns this type of database with "ignorant" agents/databases.

A "booster" agent, for example booster agent 124 of FIG. 2, adds capabilities to the underlying database, such that the combination of the database plus the booster agent are more suitable to synchronization, and compatible with the common synchronization engine interface. In this exemplary case, a booster agent may implement a persistent cache that records the state of the database after a synchronization session. When called to participate in a subsequent synchronization session, the booster agent can compare the present state of the database with the cached version of the database maintained by the booster agent. Preferably, a booster agent is able to interact with the database at a relatively low communications cost, since a booster agent will typically exchange more information with a database than is normally required in exchanges between an agent and a synchronization engine.

In this novel manner, the booster agent may determine differences (e.g., deletions, additions or changes to database records) in the database (farpoint) between a prior synchronization session and the present time. By further maintaining a synchronization clock, the booster agent may report coverage and respond to agenda and query synchronization rounds. As a result, the booster agent has upgraded the capabilities of the database as seen by a synchronization engine, and the combination is capable of rich synchronization. A booster agent may communicate directly with an endpoint, for example booster agent 124 communicating directly with endpoint 128, or a booster agent may communicate with a less capable agent, for example sync agent 125, that communicates with an associated endpoint. It is appreciated that no changes need be made to the operation or storage formats of the underlying database, in accordance with embodiments of the present invention.

Databases with greater pedigree capabilities that "ignorant" agents/databases may also be "boosted" or upgraded.

For example, a "simple" agent as described previously, may implement a local cache of its farpoint as described above. A booster for a simple agent may only be required to maintain a synchronization clock to implement the correct interface to a synchronization agent. Similarly, a "normal" agent may have a limited capacity to identify changed records. A booster for this type of agent can maintain a synchronization clock and apply coverage to the change history maintained by the normal agent and its database/farpoint.

In order to describe some of the functions and methods used in embodiments of the present invention, synchronization sessions are oftentimes referred to as "tea parties." The analogy is extended to include "inviting" synchronization agents to attend the parties. The parties usually have a "theme" which is generally understood to be a description of the type of information being synchronized, for example calendar information. Synchronizing multiple databases will typically involve scheduling multiple parties with differing themes, inviting agents interested in those themes and the like.

An agent (single ended synchronization agent program) is a software entity that wants to attend one or more tea parties and is prepared to behave appropriately. An agent may attend a tea party either as a tea party host or as a tea party guest. Every tea party has a "Tea Party Theme," for example, the type of information to be synchronized. Agents attend tea parties because they are interested in the theme of the tea party. For example, the agent is associated with (represents) a database that includes the particular type of data.

The purpose of a Tea Party is to potentially exchange information between databases. The agents at a tea party exchange information. Some of the information will relate to the tea party theme. One of the topics at a Tea Party is other Tea Parties. A Tea Party happens in three rounds, namely the Agenda Round, Query Round, and Report Round.

Figure 3A:
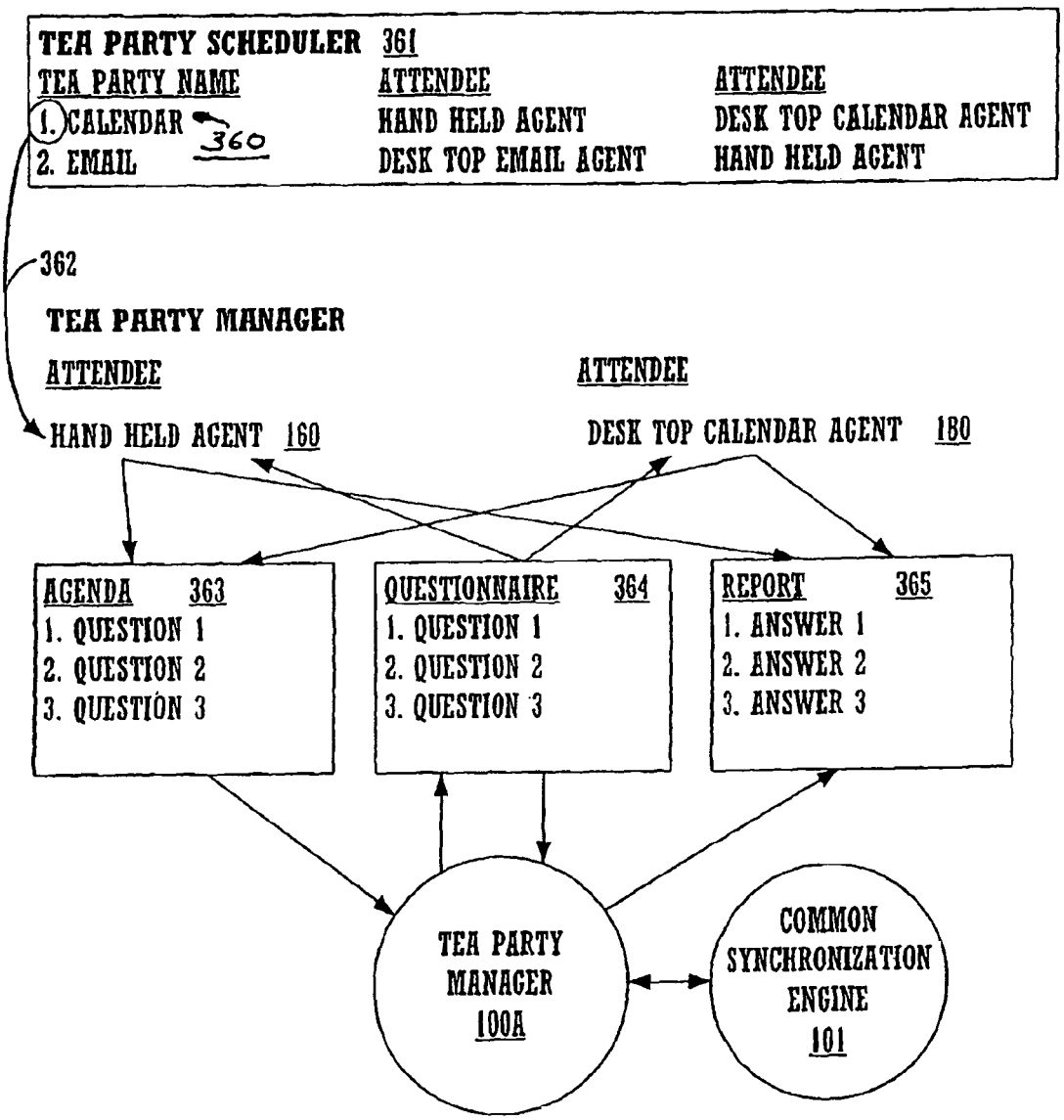
FIG. 3A depicts elements of a tea party and data flows associated therewith, according to an embodiment of the present invention.

FIG. 3A depicts elements of a tea party and data flows associated therewith, according to an embodiment of the present invention.

The Tea Party Scheduler 361 has a list 360 of Tea Parties and which agent is hosting and which agent(s) are attending as guests. For example, the first tea party on list 360 is labeled "calendar," and has a hand held agent as host, and a desk top calendar agent as a guest. The Tea Party Scheduler operates by taking the first Tea Party on its list and giving 362 it (sending the information) to the Tea Party Manager software that operates the Tea Party.

The Tea Party Agenda 363 is a detailed list of questions assembled at the beginning of a Tea Party. It is used to later query agents. The Tea Party Report 365, produced during the Query Round, is the assembled answers to the questions on the agenda.

The Tea Party Agenda Questionnaire 364 comprises the questions handed out to each attending Tea Party Agent, e.g., hand held agent 160 and/or desk top calendar agent 180, during the Agenda Round of a Tea Party. There are two questions: "What questions do you have for the Agents at this party?" and "What kind of questions do you feel qualified to answer?" These questions typically are answered by statements of coverage. For example, "I am able to answer questions (provide information) up to a given coverage, and need information beyond that coverage."

The Tea Party Query Questionnaire 364 is a custom questionnaire given to a Tea Party Agent (recipient) by the Tea Party Manager during the Query Round of a Tea Party. It contains unanswered questions gathered earlier from other Tea Party Agents about areas of expertise declared by the recipient Tea Party Agent.

The Tea Party Report 365 is a custom report given to a Tea Party Agent (recipient) by the Tea Party Manager during the Report Round of a Tea Party. It contains the available answers to the questions posed by the recipient during the earlier Agenda Round.

The Tea Party Manager gets a description of a Tea Party from the Tea Party Scheduler 361 software module. The Tea Party Manager then conducts the Tea Party according to the proper Tea Party Procedure.

To initiate a tea party, the Tea Party Manager contacts each Tea Party Host on the list of hosts for the Tea Party, e.g., hand held agent 160. Each Tea Party Host responds by indicating whether or not they are willing to host the Tea Party. If no Tea Party Host is willing to host the party, then the party is cancelled.

If at least one of the Tea Party Hosts is willing to host, then all of the Tea Party Agents (Guests and Hosts) are contacted. They indicate whether they will be attending. Non-attending agents are dropped from the list. Attending Tea Party Agents may also indicate their level of expertise on the Tea Party Theme. This is an efficiency consideration.

During the Agenda round, the Tea Party Manager seeks to create a Tea Party Agenda 363. The Tea Party Manager asks all of the Tea Party Agents to fill out the Tea Party Agenda Questionnaire 364. The Tea Party Manager then gathers up this information and organizes it for use in the next round.

During the Query round, the Tea Party Manager attempts to find answers to all of the questions on the Agenda 363. The Tea Party Manager ranks all of the attending Tea Party Agents according to their level of expertise on the Tea Party Theme. During the Query Round, Tea Party Agents are queried in order of expertise. The most knowledgeable are queried first. The least knowledgeable are queried last in one example. For each Agent the Tea Party Manager prepares a custom questionnaire that contains all of the unanswered Tea Party Agenda questions within the area of expertise of the agent. The questionnaire is given to the agent. When the response is received the information is added to the Tea Party Report 365. The Tea Party Manager also modifies the Tea Party Agenda 363 by removing fully answered questions and modifying partially answered questions to ask only the unanswered portion. The modified Tea Party Agenda is then used to query the next agent, proceeding in this manner through all of the agents.

During the Report round, the Tea Party Manager updates each of the agents. For each agent, the Tea Party Manager produces a custom Tea Party Update. This is the Tea Party Report filtered to answer only the questions asked by the recipient agent during the Agenda Round. Each agent is given its Tea Party Update.

To complete a tea party, the Tea Party Manager informs all of the agents that the party has completed.

The Tea Party Scheduler attends every Tea Party. It lists itself as knowledgeable about Tea Parties. Agents that want to get a party started ask the question (during the Agenda Round), "Who wants to go to a party about <theme> happening <when>?" During the Query Round agents can sign up for the party. The Tea Party Scheduler then schedules any parties with at least one host. This schedule is available during the Update Round. There are only two times at which parties can be scheduled, namely "Sooner" or "Later." A party scheduled as "Sooner" is placed at the front of the party list. A party scheduled "Later" is placed at the end of the party list.

The Tea Party Registration Agent runs a static registration service for its client Agents. Client agents statically register at install time for specific parties. It is the job of the Tea Party Registration Agent to make sure that the correct Tea Parties are scheduled and that they include the correct clients. The Tea Party Registration Agent generates proxy agents for its clients. These proxy agents are registered dynamically for parties and the proxies then handle loading and unloading clients when the Tea Party occurs.

Agents that are clients of the Tea Party Registration Agent can list Tea Party Themes that interest them. There are standard fields to specify, such as user, device id, creator id, database type, database name, category, etc. These fields can be left blank, filled in with a specific value, or marked as a wild card. The client also specifies whether to attend as a host or as a guest. Wild cards are not allowed when registering as a host.

A special type of tea party is a "floating" tea party. An executable software program can call the Tea Party Scheduler to schedule a Tea Party. If registered client agents are wanted as guests or hosts, then it is a good idea to include the Tea Party Registration Agent as a host and to also choose an appropriate theme.

Figure 3B:
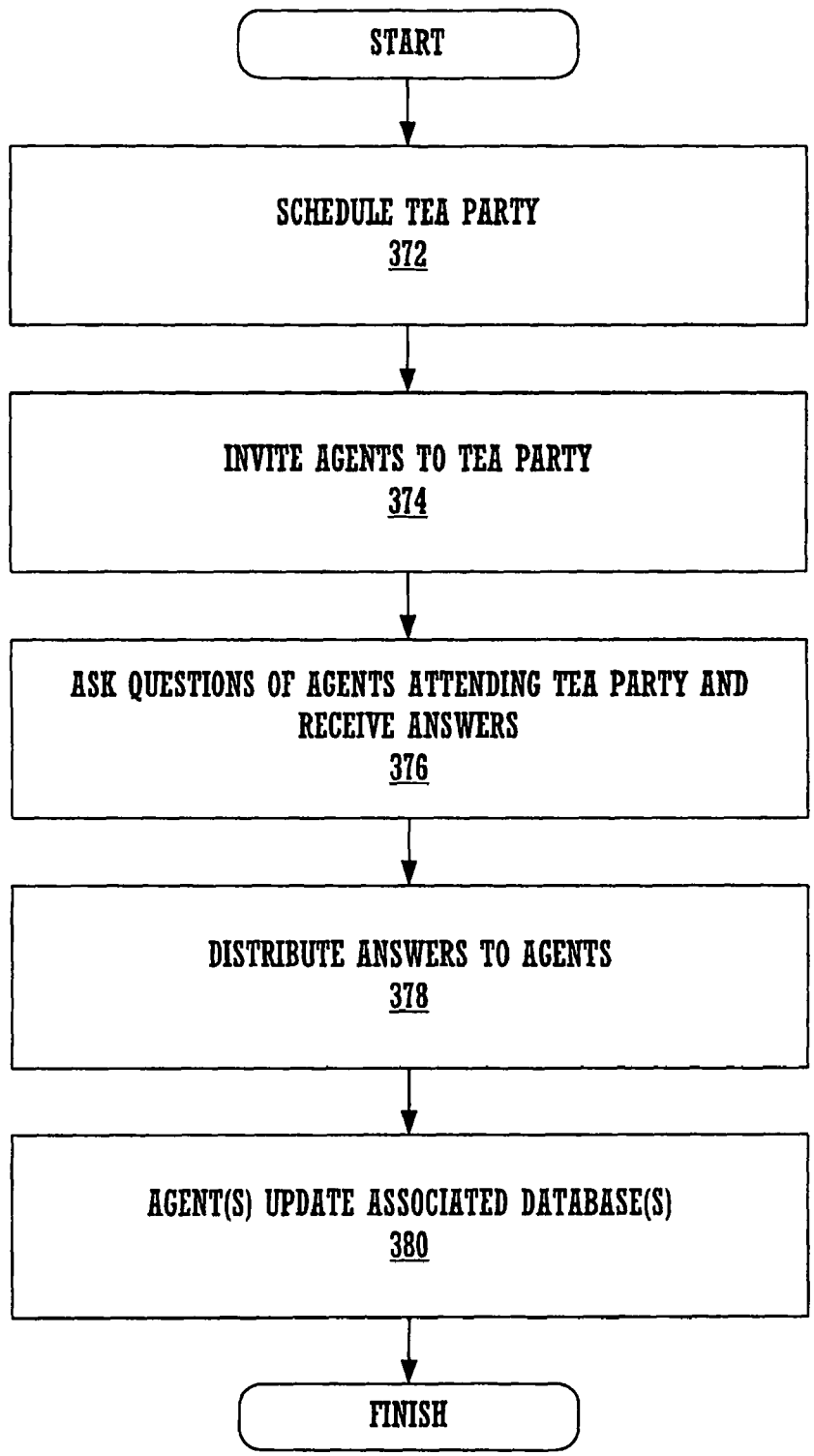
FIG. 3B illustrates a method of synchronizing databases, according to an embodiment of the present invention.

FIG. 3B illustrates a method 370 of synchronizing databases, according to an embodiment of the present invention.

In step 372, a tea party is scheduled. Tea parties can be scheduled for many reasons, e.g., in response to a question received during a previous tea party or in response to a specific event, for example a single from a synchronization cradle.

In step 374, agents are invited to the tea party. In step 376, agents that have indicated a desire to attend the tea party are asked questions as to what questions the agents have for other participants in the tea party, and as to what information the agents can supply. These questions form an agenda for the tea party. As discussed above, the questions take the form of "What does a specific agent know?" and "What does a specific agent want to know?" These questions typically are answered by statements of coverage. For example, a specific agent is able to answer questions (provide information) up to a given coverage, and it requests information beyond that coverage.

In step 376, the questions on the tea party agenda are asked of the agents attending the tea party, and available answers are received.

In step 378, the answers received in step 376 are distributed to the agents of the tea party. In an optimization, the answers may be directed to only the agent asking a question calling for a particular answer.

In step 380, an agent receiving database information updates its associated database.

In addition to agents that synchronize with common databases, for example a calendar or phonebook databases, there may be a number of more specialized agents participating in a synchronization session. These agents are designed to perform special functions, and generally typical application programs do not access their endpoints. In some cases, prior art implementations of such functions required specialized two-ended conduits and specialized databases or endpoints on at least one side of the conduit. In contrast, as described previously, the present single ended synchronization agents communicate with a single database, for example a special database. Unlike the prior art two ended conduits, such agents are not burdened by the complexities of interacting with a second database.

One such specialized synchronization agent is backup agent 172 of FIG. 2. Such an agent may save data to disks, for example floppy disks or compact discs represented by removable media device 176 of FIG. 2, in a form that is partitionable and restorable. Partitionable implies that each dataset should be backed up to a separate disk file. This is to enable data transfer between users by distributing the file. This file should be restorable for any user.

A second type of specialized synchronization agent is restore agent 174 of FIG. 2. A restore agent can be complimentary to a backup agent.

Another specialized synchronization agent is a "handheld agent," for example hand held synchronization agent 160 of FIG. 2. The hand held agent may participate in multiple synchronization sessions for a variety of types of data. As a participant in various synchronization sessions, the handheld agent moves data from a handheld computer to the synchronization engine, and moves information from the synchronization engine to the hand held computer. Because the hand held agent synchronizes all of the handheld based data with the common synchronization engine, most developers of hand held applications may not have to write handheld code when developing single ended synchronization agents. Developers may only need to create code for moving data between the synchronization engine and their endpoint. In contrast, with the prior art double ended conduits, since one endpoint was a hand held database, developers of hand held applications were required to create a complete conduit.

Yet another special synchronization agent is device information agent 162 of FIG. 2. A device information agent collects the (primarily user selectable) preferences and features of the handheld computer so that they may be accessed later. It may store this data in a disk-based persistent store (not shown) on a desktop computer, and allows access to that information through a set of applications programming interfaces, APIs. It is to be appreciated that device information agent 162 communicates with hand held computer 115 through common synchronization engine 100 and hand held synchronization agent 160.

Install agent 164 of FIG. 2 is a specialized single ended synchronization agent to install code and data onto a hand held computer. Programs and the like may be downloaded, for example, from internet websites onto desk top computer system 105, transferred and loaded onto hand held computer 115 via install agent 164. It is to be appreciated that install agent 164 communicates with hand held computer 115 through common synchronization engine 100 and hand held synchronization agent 160.

A novel special type of synchronization agent is a caching agent, for example caching agent 182 of FIG. 2. Such an agent acts as an intermediary between a temporary working memory used by the Synchronization Engine (used for reconciliation during synchronization sessions) and a data structure in long term memory, for example a file on rotating magnetic media (not shown). Saving information to a long-term memory gives persistence to the results of sync parties.

During a synchronization session, all of the agents associated with a data type typically attend that particular synchronization party. However, in practice a number of situations may arise in which all agents associated with a data type are not available. For example, a handheld computer may not be connected to a desktop computer, a central synchronization server may not be online, or a wireless connection may be dropped. Thus, because not all of the endpoints may be present, the corresponding agents may not be able to attend the party. These absent agents are of course not able to process the deltas for the current synchronization session, and later will have to "catch up." The data in the persistent cache allows these "tardy" agents to do just that.

For example, database "S" is maintained on a remote server. Database "D" is maintained on removable media on a desktop computer. Database "H" is maintained on a hand held computer. The hand held computer and the desktop computer may be connected together to synchronize their common databases at a point in time during which the desktop computer is unable to communicate with the server. The desktop computer and the hand held computer complete their synchronization such that database "D" and database "H" are synchronized. At a later time when database "D" has been removed from the desktop computer, the desktop computer and the server are able to communicate. Due to the persistent store and a caching agent, database "S" can be synchronized, even though neither database "D" nor database "H" are available.

The Caching Agent will attend all sync parties whose theme implies the reconciliation of data. The agent will read from the persistent store during the query round and will write out a new file during the report round. A caching agent attends, as guest, Tea Parties with themes organized around databases for which it is configured to provide caching. During the Agenda Round it asks "What's new with this database that I don't know?" and lists itself as an expert on the data it has in its cache. During the Query Round it will receive queries for data that It has in its cache. During the Report Round it will receive updates to add to its cache.

A way is provided for a set of coordinating agents to request that information from their databases not be cached. This is for agent developers that do not want to have a disk-based representation of the data, e.g., for security reasons.

A role of a common synchronization engine is to detect and reconcile conflicts, for example records from two or more endpoints that have been modified, such that the reconciliation action will result in a "conflicted" state. Preferably, the conflict should be resolved in the application program that uses the database (e.g., on the handheld computer or on the desktop) since that application is capable of displaying the data to a user. Consequently, identified conflicts may not be resolved during the synchronization session. The resolution may be indefinitely postponed and the conflicted state may be retained.

A specialized conflict resolution agent 184 of FIG. 2 may resolve conflicts according to a set of user-modifiable rules. Such an agent should only resolve conflicts for a dataset when there is no other possibility for resolution.

Figure 4:
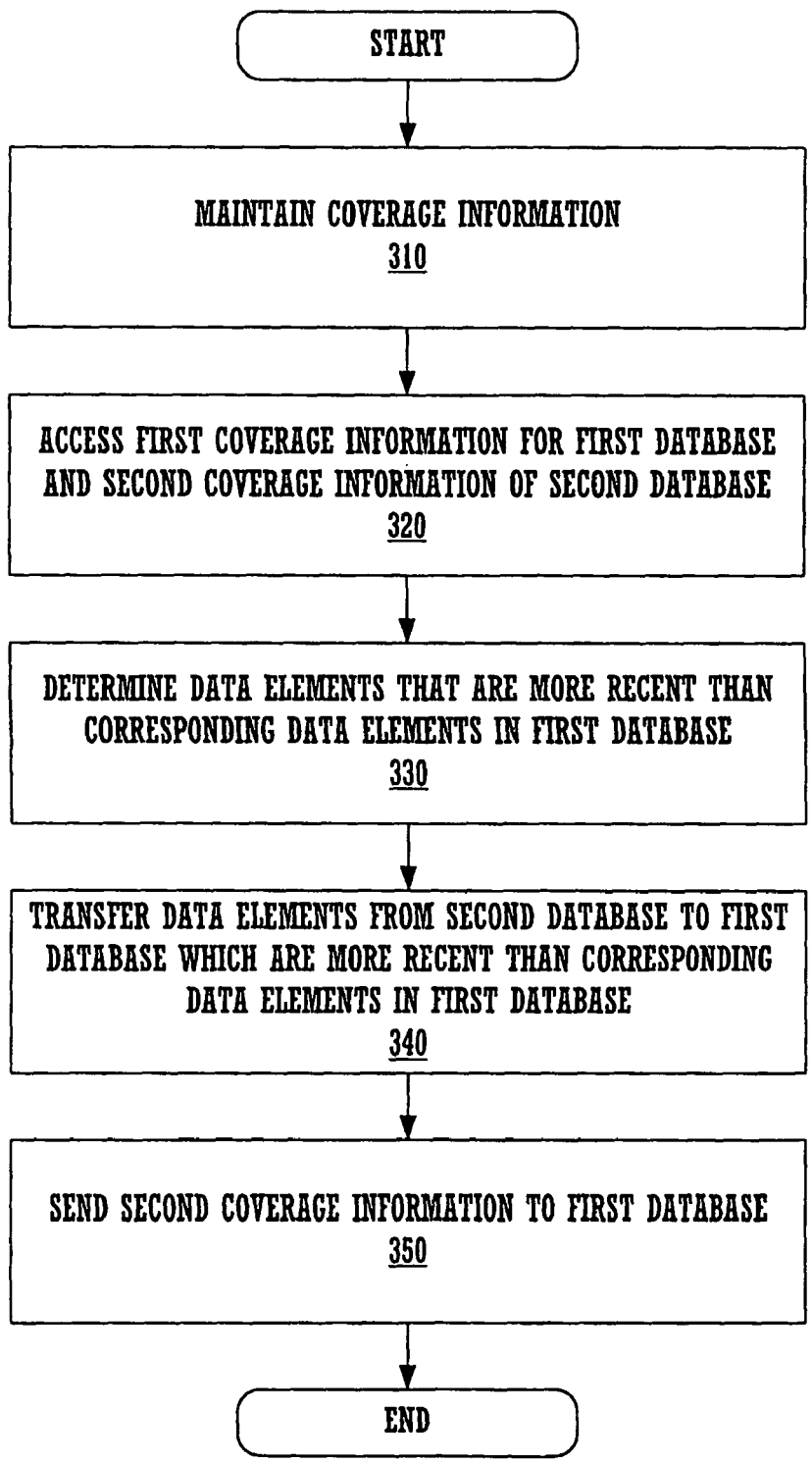
FIG. 4 illustrates a flow chart of a method for a computer implemented method of synchronizing databases, according to an embodiment of the present invention.

FIG. 4 illustrates a flow chart of a method 300 for a computer implemented method of synchronizing databases, according to an embodiment of the present invention.

In optional step 310, an agent program retrieves information from its database that has changed since a last synchronization session.

In step 320 a synchronization engine program accesses information that has changed since a last synchronization session from a plurality of agent programs.

In step 330 a synchronization engine program determines that an information record from one of the agent programs is unknown to another of the agent programs.

In step 340 a synchronization engine program sends the unknown information to the unknowing agent program. Optionally, a synchronization engine program may detect that two or more agents have an information for the same record that is unknown to other agents. In this situation, the synchronization engine program may identify such information records as being in conflict prior to providing the new records to all (other than the providing) agents.

In optional step 350, an agent program conveys the (new) information to its endpoint.

In this novel manner, single ended agent programs in cooperation with a common synchronization engine are able to synchronize databases. There are numerous advantages of this method over the prior art, including that the agent programs do not implement synchronization logic and agent programs are required to understand only a single database. These aspects of the novel single ended agent programs greatly simplify the design, construction and maintenance of this software when compared with the prior art. Such improvements in this field may result in greater deployment of higher quality synchronization systems than is currently present in the industry.

In order to more fully describe aspects of the present invention, portions of the application programming interface used by single ended synchronization agents are hereby provided. More specifically, a set of software functions that perform various synchronization tasks are defined. Also explained are some of the structures and parameters needed to correctly call these functions. It is appreciated that other implementations of such functions are well suited to embodiments of the present invention.

According to an embodiment of the present invention, single ended synchronization agents define an interface with a Synchronization Manager ("Sync Manager") and a Synchronization Engine. A Synchronization Manager uses this interface to coordinate, or schedule a synchronization session.

The interface can be viewed as notifications sent by the Synchronization Manager to the agent, however each of these notifications is accomplished by calling a corresponding entry point within the agent. The Synchronization Engine reconciles the data using an internal memory-based cache.

Preferably, the interfaces use handles to access data structures. APIs provide access information given a handle to that data structure. This method abstracts the data in a language-independent manner.

Agents are dynamically loaded by the Sync Manager and are executed by calling into their entry points. Note the difference between a synchronization agent as a dynamically loadable module, and an instance of that module during execution. There is typically only one copy of a particular Agent on the desktop computer, and that copy (the module) is loaded by the Sync Manager. During a synchronization session however, instances of a particular agent may execute many times. For example, an Agent Module may wish to attend multiple synchronization sessions, and thus an instance of that Agent will be run for each session. It is also possible to have multiple instances of the same Agent Module attend the same session. This is recommended for Agents whose far point is a standards-based protocol that may be used by different applications. The following two entry points are called by the Sync Manager to interrogate an Agent Module to determine the number of instances and the synchronization sessions they attend.

AgentModuleGetInfo( )

This entry point is called by the Sync Manager to get global information relating to the Agent Module. This information is its unique ID, its persistence, and its version.

AgentGetInfo( )

This entry point is called by the Sync Manager to get instance-specific information from the Agent Module. Each time the Sync Manager calls this entry point, the Agent Module returns information about a specific instance of the Agent. This information includes a unique instance ID, a displayable instance name, and the theme where this Agent may attend.

SyncSessionBegin( )

This entry point is called by the Synchronization Manager after a request is made to begin a synchronization session.

SyncSessionPreSync( )

This entry point is called by the Sync Manager after SyncSessionBegin( ) has completed and before any themes are placed on the scheduling queue.

SyncPartyInvite( )

This entry point is called by the Sync Manager when it processes the next theme on the queue. Each agent is called and allowed to state whether or not they will attend the specific synchronization session (party).

SyncPartyBegin( )

Each agent that has indicated that it will attend a sync session is called. This entry point is called before any syncing is done.

SyncPartyAgenda( )

Each agent in the sync session is asked for its level of expertise and its area of interest. A level of expertise is the set of data questions an agent can answer. Later (SyncPartyQuery( )), the Sync Manager may ask this agent these questions. "Area of interest" is the set of data questions the agent requires an answer to. Later (SyncPartyReport( )), the Sync Manager may present the agent a set of answers.

SyncPartyQuery( )

During the agenda round agents indicated what questions they answered. Agents also stated what information they require. For each question and answer correspondence, the appropriate agent is called and asked the indicated question.

SyncPartyReport( )

For each agent that asked a question, the report entry point is called with the answer.

SyncPartyEnd( )

This entry point is called into each agent attending a sync session when all of the synchronization rounds are finished.

SyncSessionPostSync( )

This entry point is called by the Sync Manager when all of the themes in the queue have been processed. Every agent is called.

SyncSessionEnd( )

This entry point is called by Sync Manager after all of the post sync processing has completed. All agents are called.

SyncSessionCancel( )

This entry point is called if the synchronization session terminates abnormally and one of the agents is currently processing a notification. Only that agent's entry point will be called.

During a synchronization session the synchronization engine will call the agents to inform them as to the state of the synchronization session and to give the agents an opportunity to direct and participate in synchronization sessions (parties).

A "theme handle" is a handle (name) to the synchronization theme, or type of data being synchronized. This is an abstract data structure maintained by the Sync Manager. The agent can use a set of "Theme APIs" to access information about the theme.

There are two contexts in which themes are presented. The first is when an application makes a call into the Sync Manager to initiate a synchronization session. That application will pass in a theme. The theme indicates why the sync is being initiated, e.g., it could be a sync for a specific database (creator ID) or a manufacturer-defined theme created to handle special synchronization sessions. The theme is the theme of the entire synchronization session.

The other context in which a theme is presented is during the synchronization parties. In this context, the theme defines the purpose of the party. The theme for a party context is only valid for the duration of the party.

"Synchronization Context" is an abstract data structure maintained by the Sync Manager. The Sync Context encapsulates state information that enables information sharing and re-entrancy. The Sync Context may be seen as a set of environments that contain attributes defined as (keyword, value) pairs.

In general, there are three primary data environments (e.g., spans of data access) associated with synchronization, according to an embodiment of the present invention. These data environments are "session," "theme," and "agent." The session environment is shared by all agents and any keyword contained in that environment is available to any agent throughout the entire synchronization session. The theme environment is shared by all agents that are participating in the sync party for that theme. Keywords in the theme environment are no longer valid after the conclusion of that sync party. The agent context provides a "private" space for each agent. These keywords are persistent throughout the entire synchronization session.

AgentModuleInfo

This data structure is used to pass Agent Module information from the Agent Module to the Sync Manager. It is used during the AgentModuleGetInfo( )call.

```
typedef struct    AgentModuleInfoTag {
    GUID          id;
    Uint16        persistence; / / Should be a typed enum
    - TCHAR       version[kAgentModuleVersionSize];
} AgentModuleInfo;
```

AgentInfo

This data structure is used to pass Agent Instance information from the Agent Module to the Sync Manager. Each time the Sync Manager calls the Agent Module this data structure is used. Each use of the data structure corresponds to information regarding a single Agent Instance.

```
typedef struct AgentInfoTag {
    Uint16      agentId;       // Agent assigned; must be
unique within a module
    - TCHAR     agentName[kAgentNameSize];
    -T CHAR     partyTheme[kThemeNameSize];
} AgentInfo;
```

AgentModuleGetInfo( )

The Sync Manager calls the Agent Module to obtain module-specific information. The Sync Manager calls this entry point in the Agent Module once, when it is loaded for the first time. This call is independent of synchronization sessions.

AgentGetInfo( )

The Sync Manager calls the Agent Module to obtain instance-specific information. When a parameter is true (non-zero), the Sync Manager will call this entry point again, in order to get information about the next Agent Instance. When there are no more instances to talk about, the Agent Module sets this to false (zero.) Note that in most cases, there is only a single Agent Instance per Agent Module. The Sync Manager presets this parameter to false (zero), so an Agent Module need not modify it except in the case that there are additional instances.

SyncSessionBegin( )

This is the first notification sent out by the Sync Manager. It is an indication that a synchronization session is about to start. The Sync Manager sends this notification to every agent once per synchronization session. Agents can use this notification to decide if the sync should begin for the given user. An agent can choose to cancel or abort the sync by calling the Sync Manager's cancel function.

SyncSessionPreSync( )

This notification is sent before the Sync Manager starts any sync parties. It provides an opportunity for agents to perform any initialization. The Sync Manager sends this notification to every agent once per synchronization session. Agents can use this notification to perform any initialization (before sync parties start). The Device Info Agent collects extended device information at this time.

SyncSessionPostSync( )

This notification is sent after all sync parties have been completed. It provides an opportunity for agents to perform any clean up. The Sync Manager sends this notification to every agent once per synchronization session. Agents can use this notification to perform any clean up activity (after all sync parties have completed). This is an opportunity for backup agents to backup databases and files to the desktop. Device administration or inventory-type agents can also collect device information at this time. The Device Info Agent could also collect extended device information at this time.

SyncSessionEnd( )

This notification is sent by the Sync Manager to indicate that the sync session for the specified user is about to terminate. Parameters are either an enumerated type or a string indicating the reason that the sync was cancelled. If this is a string it should be possible to localize it. The Sync Manager sends this notification to every agent once per sync session.

SyncSessionCancel( )

This notification is sent asynchronously by the Sync Manager to indicate that the sync session has been cancelled. This API may have two parameters. A "state" is the state of the sync when it was cancelled. It may also indicate which agent cancelled the synchronization session. A "reason" is either an enumerated type or a string indicating the reason that the synchronization session was cancelled. If this is a string it should be possible to localize it.

SyncPartyInvite( )

This notification is called by the Sync Manager when processing the next theme on the queue. Every agent is called and given the opportunity to join or refuse the sync party invitation. The parameter is answer for the invitation. An agent sets this Boolean to true if attending the sync party, false otherwise. Not setting the parameter is equivalent of setting it to false.

SyncPartyBegin( )

This notification is sent by the Sync Manager after the set of participating agents is known, but before any data processing has occurred. This allows the agents to perform initialization.

SyncPartyAgenda( )

This notification is sent by the Sync Manger to all of the agents in the currently scheduled sync party (one theme). Each agent directs the sync by presenting set of questions (the query) and answers (the level of expertise). A first parameter of this call is "query expertise." This parameter is an abstract data structure that contains a set of (creator Id, database names, category Id) triples that defines either a question or answer. A second parameter is "round." This is the round number. The synchronization component of a sync party (agenda, query, report) may occur several times. This allows agents to order synchronization in the case of data dependencies.

SyncPartyQuery( )

The Sync Manager calls this notification to ask a question of an agent in the sync party. The question will always correspond to one of the queries returned to the Sync Manager in the expertise parameter of the SyncPartyAgenda( ) call. There are three parameters to this call, query, answer and round.

A query is an abstract data structure that contains a (creator Id, database names, category Id) triple that defines a question. An answer is an abstract data type that contains the answer to the question. The answer is in the form of a set of data records that match the attributes of the question and are records which are new, changed, or deleted since the last time this question was asked. The round parameter is the round number. The synchronization component of a sync party (agenda, query, report) may occur several times. This allows agents to order synchronization in the case of data dependencies.

SyncPartyReport( )

This notification is called by the Sync Manager to present the answers to an agent that were asked during the agenda round. The three parameters are answer, round and repeat. The answer parameter is the answer to the question. The round parameter is the current round number. If the "repeat" parameter is left alone or set to false, no subsequent sync round will occur. If set to true, an additional sync round will follow. If any agent in the sync party requests an additional round, all agents will participate in the new round.

SyncPartyEnd( )

This notification is called by the Synchronization Manager after all of the synchronization rounds are completed for a sync party (one theme). Each agent in the synchronization session (party) is called. This allows any agents to perform clean up. This notification contains a single parameter, "reason." "Reason" is either an enumerated type or a string indicating the reason that the sync was cancelled. If this is a string it should be possible to localize it.

There may be at least three entry points to an agent, namely "agenda," "query" and "update." According to an embodiment of the present invention, these entry points correspond to "rounds" or phases of a synchronization process.

These three rounds allow an agent to provide and/or receive synchronization information. In the agenda round, an agent inquires of a common synchronization engine for updates to the agent's database. In addition, the agent identifies the database that it represents, and provides information as to the level of information that the database contains. Likewise, the agent also informs the common synchronization engine of the agent's "expertise," for example the information contained within the database. It is frequently the case that the inquiry and expertise contain the same information. For example, a database may generally be able to provide information to a certain level, and request any updates beyond that level. It is to be appreciated, however, that the inquiry and expertise may not contain the same information. For example, an agent representing a database contained on read only media (e.g., a CD-ROM), may describe expertise while making no inquiries, since its database is incapable of storing new information.

A data logging agent, for example a program used to make a permanent copy of financial transactions, may appear as "write-only" memory. Such an agent might inquire, e.g., for all information, and profess no expertise.

One method of describing the level of information in a database is by "coverage." Co-pending, commonly owned U.S. patent application Ser. No. 10/159,462 filed May 31, 2002, entitled "Fast Synchronization of Computer Databases Using Coverage Status" discloses a novel system of coverage that is well suited to embodiments of the present invention, and is hereby incorporated herein by reference in its entirety.

It is to be appreciated that other methods of maintaining and describing the level of information in a database are well suited to embodiments of the present invention. Co-pending commonly-owned U.S. patent application Ser. No. 09/710,605, filed Nov. 10, 2000, entitled "Optimized Database Technique to Enable Faster Data Synchronization" to McCaw is hereby incorporated herein by reference in its entirety. U.S. Pat. No. 6,000,000 and U.S. patent application Ser. No. 09/710,605 describe additional methods of maintaining and describing the level of information in a database.

Multiple synchronization agents may provide queries and expertise during an agenda round. After completing an agenda round, a common synchronization engine may determine which database(@) contain updated information. For example, given a list of agent queries and statements of expertise in the form of coverage, a common synchronization engine may determine which database(s) contained updated information. It is to be appreciated that no single database may contain all information necessary to represent a new coverage, and that in general information may be retrieved from more than one database.

Having determined a new coverage, a common synchronization engine accesses database information from source database agents during the query round. In the report round, information is provided to destination database agents in order to bring the databases up to the new coverage level.

Figure 5:
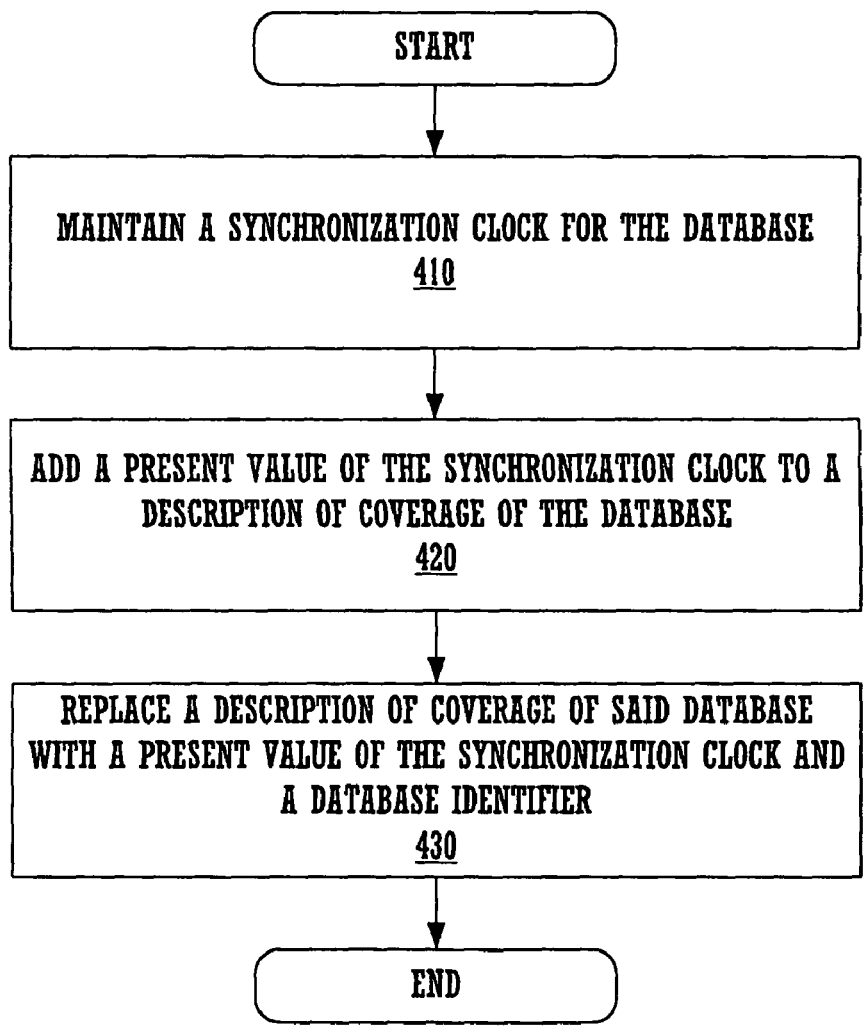
FIG. 5 is a flow chart illustrating a method of single ended synchronization agents communicating with a common synchronization engine, according to an embodiment of the present invention.

FIG. 5 is a flow chart that illustrates a computer implemented method 400 of indicating coverage of a database, according to an embodiment of the present invention.

In step 410, a synchronization clock is maintained for the database. The synchronization clock may be unique to the database, or multiple databases may utilize a single synchronization clock. According to an embodiment of the present invention, the synchronization clock may be a monotonic sequence of symbols, for example a count of integers which only increases. As described previously, a synchronization clock should be advanced to the next symbol, e.g., to the next number, when the database is synchronized.

In step 420, the present value of the synchronization clock is added to a description of coverage of the database in response to a change to a data element of the database. For example, if record number 27 of database D is modified while the D synchronization clock is at 81, then "D:81" may be added to the coverage of database D. It is appreciated that the pedigree of record 27 may also be updated using the synchronization clock to reflect the modification.

In optional step 430, a description of coverage of the database may be replaced with a present value of the synchronization clock and a database identifier. For example, building upon the previous example, prior to the modification of record 27, the coverage of database D may have been "T20636D80." Step 420 above may have modified the coverage to produce "T20636D80D81." The present step may replace a previous coverage of the database (D) with the present value of the synchronization clock and database identifier. This may simplify the new coverage to "T20636D81" as the replaced value may be redundant. Including this step in a method may improve the storage and transmission requirements associate with database coverage.

Figure 6:
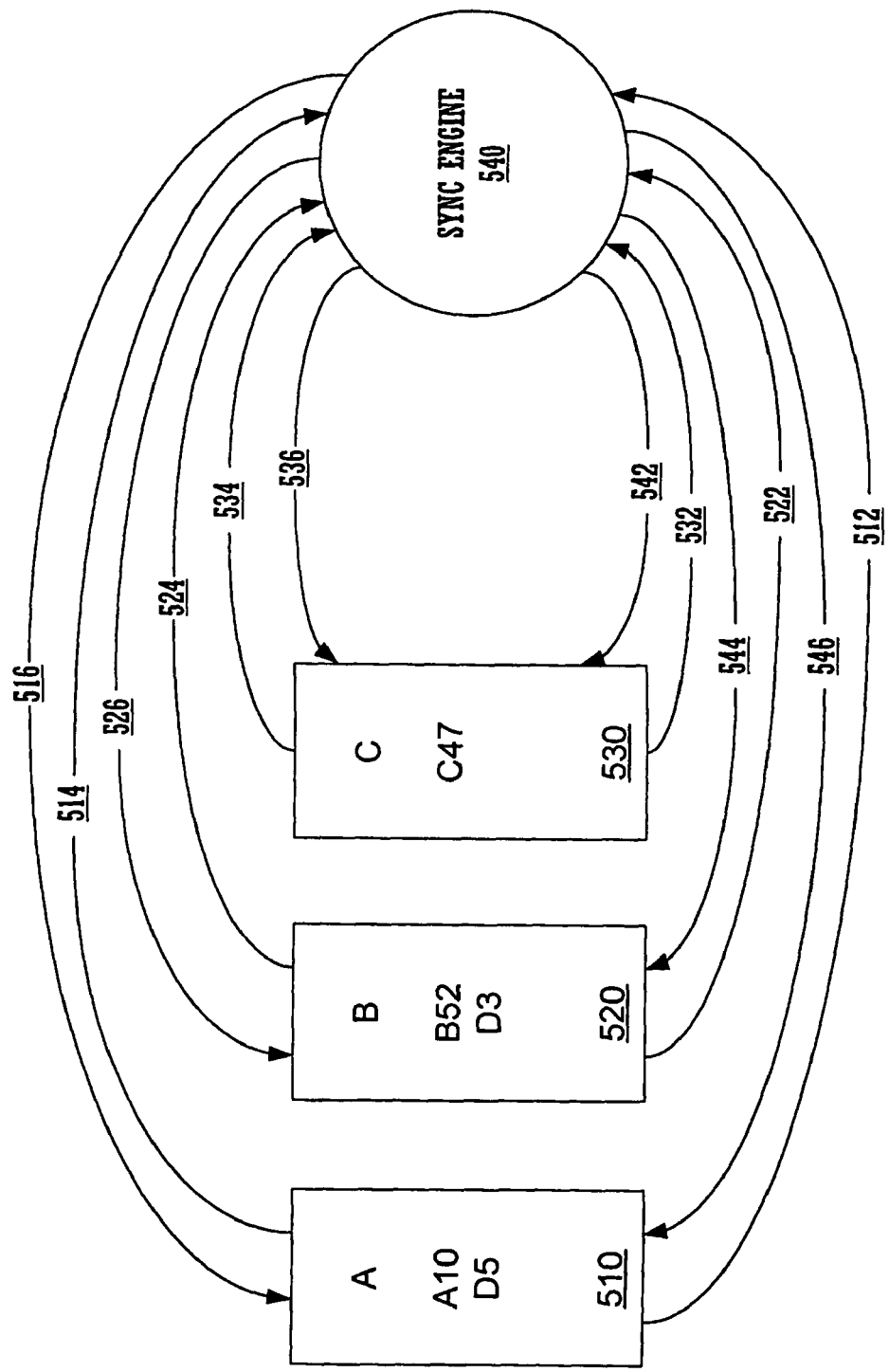
FIG. 6 is a data flow diagram illustrating three phases of synchronization, according to an embodiment of the present invention.

FIG. 6 is a data flow diagram illustrating three phases of synchronization, according to an embodiment of the present invention. Single ended synchronization agents A 510, B 520 and C 530 are functionally connected to common synchronization engine 540. For purposes of clarity, the databases associated with synchronization agents 510 through 530 are not shown. It is to be appreciated that in general agents "represent" an associated database and generally do not store persistent data themselves. The coverage of each associated database is shown within the agent box of FIG. 6. More specifically, the database ("database A") associated with agent A 510 is shown as having coverage "A10D5," database/agent B 520 is shown having coverage "B52D3" and database/agent C is depicted having coverage "C47."

During an agenda round of synchronization, agent A 510 sends coverage information 512 ("A10D5") to common synchronization engine 540. In similar manners, agent B 520 sends coverage 522 ("B52D3) and agent C 530 sends coverage 532 ("C47") to common synchronization engine 540.

Common synchronization engine 540 determines maximum coverage, source(s) of database information corresponding to the maximum coverage, and the information needed by each database to bring its coverage to the maximum level. Optionally, common synchronization agent 540 may determine the minimum (or delta) information needed by each database to bring its coverage to the maximum level. For example, using the exemplary coverages of FIG. 6, the maximum coverage is "AIOB52C47D5." This is determined by combining the coverage of each database and simplifying any duplicate database identifiers. For example, both database A and database B have information from database D. Database A's information has a higher coverage with respect to database D. Consequently, its coverage supersedes the coverage of database B.

During a query round, common synchronization engine 540 inquires of the agents/databases for the actual database information represented by the coverage, or the delta information needed to update a database to the maximum coverage. For example, inquiry 546 asks agent A 510 to provide all "A" type records and all "D" type records, since no other database present has "A" type records. Although database "B" has some "D" type records, it requires updates to bring it to coverage level "D5." In addition, database "C" has no "D" type records, and consequently needs them all.

Similarly, inquiry 544 asks agent B 520 to provide all "B" type records, since no other database present has "B" type records. As noted above, agent B 520 may not be asked for type "D" records.

Inquiry 542 asks agent C 530 for all "C" type records, since no other database present has "C" type records.

As a second portion of the query round, the agents send the requested information to common synchronization engine 540. For example, information transmittal 514 sends all "A" type records and all "D" type records from database/agent A 510 to common synchronization engine 540. Likewise, information transmittal 524 sends all "B" type records from database/agent B 520, and information transmittal 534 sends all "C" type records from database/agent C 530.

In the report or update round, common synchronization engine 540 redistributes the information records to the agents/databases that need the information. For example, update information 536 sends all "A," "B," and "D" records to agent "C" 530. Likewise update information 516 sends all "B" and "C" information to agent A 510.

Update information 526 sends all "A" and "C" information to agent B 520. However, common synchronization engine 540 may only send records of type D4 and D5 to agent B 520, since database B has previously indicated that it has D type records through coverage level D3. Sending only the difference or delta information optimizes the amount of information transferred. Such optimizations may be important for communication channels, such as wireless links, which have a relatively high communication cost or are otherwise bandwidth limited. It is to be appreciated that synchronization agents subsequently update their respective databases.

One Up One Down Tea Parties

Performing synchronization with a remote device that has a time lag or other communication costs can lead to a desire to limit the communication to a single round in order to minimize the communication cost. The term "one up one down" means that there is a single communication in one direction followed by a single communication in the other direction. This constraint can be incorporated into the Tea Party protocol if the remote (e.g., wirelessly connected) device instigates the synchronization. This is covered below in the "First Case" scenario. If the remote device is passively responding to a request for synchronization then the constraint cannot be met in a single Tea Party. Either two Tea Parties are required (second case) or a One Down One Up One Down protocol is required (third case).

In a first case in which a remote device initiates a synchronization, the down side device first contacts its remote agent. The "remote" agent (e.g., agent for the remote device) schedules a Tea Party for the appropriate database.

During an agenda round, the remote agent asserts the question "What is new in <database> since <remote coverage>?". The remote agent declares expertise on "contents of <database> from <start of remote deltas to <remote coverage>."

During a query round, the remote agent supplies its delta information, assuming any other agent was interested. During a report round, the remote agent receives its update report.

In a second case in which a remote device responds to a request for synchronization, synchronization may be accomplished by conducting two tea parties (synchronization sessions).

During a first agenda round, the remote agent asserts question "What is new in <database> since <prior remote coverage>?" The remote agent declares expertise on "<database> covering everything".

During a first query round, the remote agent receives and saves all queries regarding the database. During a first report/update round, the remote agent receives an update report for its far point.

At the end of the first synchronization session, the remote agent transmits the update report to the remote device along with the questions from the query round. If there is new information possessed by the remote device it formulates a response and sends it back.

During a second agenda round, the remote agent declares no questions. It declares expertise on the information received from the remote device. During a second query round, the remote device receives questions relating to the data it is holding. It provides the requested information. Since the remote agent asked no questions during the second query round, the remote agent receives nothing in its update report. The remote agent retains coverage information for use in responding to any new Tea Parties.

In a third case in which a remote device responds to a request for synchronization, synchronization may be accomplished by a one down, one up, one down communication sequence.

During an agenda round, the remote agent asserts question "What is new in <database> since <prior remote coverage>?" The remote agent declares expertise on "<database> covering everything."

During a query round, the remote agent transmits the query to the remote device. When the query is received, the remote device formulates a response, which it sends. The remote agent returns this response. In a report/update round, the remote agent sends the update report to the remote device. The remote agent retains coverage information for use in responding to any new Tea Parties (synchronization sessions).

In the first case, the remote device anticipates the query and provides a response to the query before the actual query occurs. The upload information may therefore contain information that no agent wants (for example because it was already provided via another agent or pathway.)

In the second case the query is sent to the remote device but not actually answered by the remote agent in the (first) query round. It may therefore contain questions that were subsequently provided by other agents. Also the coverage of the remote agent is anticipated. If the remote device has alternative synchronization pathways then it might be more up to date than anticipated and receive information it already has. Further, if there is more than one remote agent, the limitation to one up one down may be effectively broken by having several sequential tea parties.

The third case avoids querying the remote agent for unwanted information at the expense of having a second upload. Unlike the second case, it avoids degenerating into multiple uploads and downloads via cascading tea parties. Like the second case it anticipates the prior coverage of the remote device. If the remote device has alternative synchronization pathways then it might be more up to date than indicated. Other agents may be queried to provide this unnecessary information. Sending it to the remote device can be avoided in the third case by the remote agent filtering it out, a task normally provide by the tea party manager.

The third case is the only case of the three in which the trip delay (latency) of communicating with a remote device is added into the total synchronization time. The first case avoids this because the remote device is the starting cause for synchronization. The second case avoids this by not starting a second tea party until the remote data is available.

The preferred embodiment of the present invention, N-way synchronization of computer databases, is thus described. While the present invention has been described in particular embodiments, it should be appreciated that the present invention should not be construed as limited by such embodiments, but rather construed according to the below claims.

What is claimed is:

1. A computer implemented method of synchronizing database information comprising:
synchronizing database information by:
uploading from a first computer to a second computer an agenda question, expertise and changes to said database information since a previous synchronization session; and
downloading from said second computer to said first computer answers to said agenda question and updated coverage.

2. The method of synchronizing database information as described in claim 1 wherein said first computer and said second computer are functionally connected by a communications link.

3. The method of synchronizing database information as described in claim 1 wherein said agenda question and said expertise are the same information.

4. The method of synchronizing database information as described in claim 1 wherein said first computer initiates a synchronization session.

5. The method of synchronizing database information as described in claim 1 wherein an agent software program for said first computer resides on said second computer.

6. The method of synchronizing database information as described in claim 5 further comprising scheduling, responsive to said uploading, a synchronization session.

7. The method of synchronizing database information as described in claim 1 further comprising accessing, at a common synchronization engine software module, an agenda question and expertise from at least one agent software module associated with a database residing on said second computer.

* * * * *